(12) United States Patent
Chen

(10) Patent No.: US 6,227,822 B1
(45) Date of Patent: May 8, 2001

(54) FAN WITH IMPROVED ELECTRIC MOTOR AND MOUNTING

(75) Inventor: Yung Chen, Clarendon Hills, IL (US)

(73) Assignee: Lakewood Engineering and Manufacturing Co., Chicago, IL (US)

( * ) Notice: Subject to any disclaimer, the term of this patent is extended or adjusted under 35 U.S.C. 154(b) by 0 days.

(21) Appl. No.: 09/175,635

(22) Filed: Oct. 20, 1998

(51) Int. Cl.[7] .................................................... F04B 17/00
(52) U.S. Cl. ........................ 417/423.7; 417/360; 310/63
(58) Field of Search .................... 417/423.15, 423.7, 417/360, 423.14; 310/89, 91, 258, 42, 63

(56) References Cited

U.S. PATENT DOCUMENTS

| | | |
|---|---|---|
| 529,272 | 11/1894 | Hutin et al. . |
| 1,569,218 | 1/1926 | Dake . |
| 3,413,501 | 11/1968 | Dotto . |
| 3,469,134 | 9/1969 | Beyersdorf et al. . |
| 3,502,922 | 3/1970 | Welker . |
| 3,707,638 | 12/1972 | Nailen . |
| 3,983,621 | 10/1976 | Donahoo . |
| 4,017,776 | 4/1977 | Fiegel . |
| 4,095,130 | 6/1978 | Oshima et al. . |
| 4,371,802 | 2/1983 | Morrill . |
| 4,482,832 | 11/1984 | Minton . |
| 4,546,278 | 10/1985 | Xuan . |
| 4,606,000 | * 8/1986 | Steele et al. ......................... 363/145 |
| 4,786,834 | 11/1988 | Grant et al. . |
| 4,801,775 | 1/1989 | Cornell . |
| 4,801,776 | 1/1989 | Cornell . |
| 4,827,237 | 5/1989 | Blackburn . |
| 4,883,997 | 11/1989 | DeCesare . |
| 4,883,999 | 11/1989 | Hendershot . |
| 4,904,891 | * 2/1990 | Baker et al. ........................... 310/62 |
| 4,942,323 | 7/1990 | De Cesare . |
| 5,066,638 | 11/1991 | Lloyd et al. . |
| 5,118,977 | 6/1992 | Bertram et al. . |
| 5,130,591 | 7/1992 | Sato . |
| 5,217,353 | * 6/1993 | De Filippis .......................... 417/368 |
| 5,232,090 | * 8/1993 | Raab et al. ........................... 206/320 |
| 5,267,842 | * 12/1993 | Harmsen et al. ..................... 417/354 |
| 5,418,416 | 5/1995 | Müller . |
| 5,430,338 | 7/1995 | McMillan et al. . |
| 5,477,120 | 12/1995 | Yoshimura et al. . |
| 5,500,780 | 3/1996 | Boutaghou et al. . |
| 5,517,102 | 5/1996 | Jensen . |
| 5,604,971 | 2/1997 | Steiner . |
| 5,619,086 | 4/1997 | Steiner . |

* cited by examiner

Primary Examiner—Henry C. Yuen
Assistant Examiner—Mahmoud M Gimie
(74) Attorney, Agent, or Firm—Wallenstein & Wagner

(57) ABSTRACT

A household fan with motor and motor housing for shielding the motor. The electric motor is preferably a four-pole permanent-split capacitor motor with a narrow profile enabling it to fit within a narrow box fan, the motor having a stator including a core of stacked laminations. A first outermost lamination defines a first supporting surface, and a second outermost lamination defines a second supporting surface on which the front and rear casings are supported. Copper windings are wound about the core. A rotor has an output shaft which passes through a central region of the core. The front and rear casings are generally dome-shaped. Each casing has a circumferential side wall and a vented end wall. The front casing has a recessed area around the opening for the output shaft such that a portion of the bladed propeller assembly protrudes within the recessed area, allowing for a narrow profile design. Radially extending legs allow for mounting on parallel brackets along a rear grill of the fan.

33 Claims, 5 Drawing Sheets

FAN WITH IMPROVED ELECTRIC MOTOR AND MOUNTING

TECHNICAL FIELD

The present invention relates to the construction of a household fan. More particularly, the present invention relates to a household box fan having an industrial-standard narrow width provided with an improved motor, motor housing and mounting assembly.

BACKGROUND

Various types of household fans are currently used for cooling and ventilation. Such fans are available in a variety of shapes and sizes. Household fans typically used by consumers have an electric motor used to drive propeller-type blade assemblies. Such fans commonly employ electric motors of the type known as shaded pole motors. One common type of household fan is the "box fan" which generally includes an electric motor and fan blade assembly mounted in a casing that has an overall generally square configuration. Typical box fans usually have a metal frame having front and rear grills, fan control switches and/or knobs, and an exposed handle disposed on the outer surface of the casing. The electric motor is typically mounted in the center of the casing between the two grills. The motor is often mounted to some internal strut members, typically appearing as an elongated metal member that spans from one side of the casing to an opposed side of the casing.

One common type of box fan, often referred to as a "narrow body" box fan, has a casing width of approximately 3.75 inches. The narrow thickness of this type of box fan is advantageous for numerous reasons, including low cost of casing materials, narrow width for fitting into window openings, lighter weight, and possible reduction in the overall packaging size. Because of the narrow width of this type of box fan, however, manufacturers are limited as to the space allowed for mounting a motor and fan assembly. Therefore, the electric motor used in these types of box fans is a shaded pole motor, which is compatible with 3¾ inch box fans because they provide the necessary power to drive the blade assembly, and yet have a narrow profile capable of fitting within the permitted mounting area within the narrow casing.

However, shaded pole motors tend to be in limited supply since they require large casings which are formed by a punch press with an expensive progressing die, or with multiple punch press operations. Such casings also require an expensive painting step. Such casings are not easily die cast due to their large diameters. In addition, shaded pole motors require laminations which use low carbon steel and must pass through an expensive heat treating step. Supply of these high quality laminations is presently limited. Furthermore, shaded pole motors are inefficient, much of their input energy being lost to undesirable heat generation. In addition to the expense of the laminations, shaded pole motors require epoxy to insulate the stator, the stator is large, the windings require expensive machinery to create, and a punch press with a long feeder is required to create the large diameter casings.

Electric motors are categorized by Underwriters' Laboratory (UL) according to the difference between their operating temperatures and the ambient temperature. Motors having operating temperatures from 75° C. to 95° C. above ambient temperature are categorized as Class B, and require special insulation materials. Those motors which operate at temperatures not more than 75° C. above ambient temperature are categorized as Class A, and have less stringent requirements for insulation materials. The operating temperatures of many motors are typically more than 75° C. above ambient temperature, and therefore, require expensive Class B insulation materials.

One type of electric motor which can be manufactured at lower cost is a four-pole permanent-split capacitor (PSC) motor. PSC motors incorporate a capacitor in series with an auxiliary coil, the auxiliary coil being connected in parallel with a main coil. PSC motors can incorporate a less expensive type of laminations since a lower grade steel may be used with a silicon content. Such laminations do not require heat treatment. However, there are many problems associated with providing a four-pole PSC motor in a narrow frame of a box fan. The primary problem is that the profile of the typical four-pole PSC motor is too thick to fit within the narrow box fan, due to the construction of the motor, the internal motor windings, and the casings used for such motors. Another main problem preventing manufacturers from placing a four-pole PSC motor in a narrow box fan is the difficulty of mounting the motor in the confined mounting space. Furthermore, the operating temperature of typical four-pole PSC motors places them in the UL Class B category.

Typical mounting of motors includes attaching a mounting plate to the back of the motor casing, and fastening the mounting plate to the internal mounting, such as the strut within the box fan. This type of mounting requires use of additional space in the fan housing, also making it impossible to mount a four-pole PSC motor in a narrow housing to provide necessary clearance between the bladed propeller and the front grill of the fan. Further, this type of mounting, with a separate mounting plate, requires additional manufacturing cost and time, and risks mis-alignment of the motor in the fan housing.

One attempt at mounting a motor without a mounting plate was contemplated in U.S. Pat. No. 5,430,338 issued to McMillan et al. ("McMillan"). McMillan teaches sandwiching the stator core within upper and lower housing casings to facilitate construction of the electric motor. Sandwiching the stator core within the housings alleviates manufacturing problems associated with aligning and configuring the stator and rotor within the electric motor housing. However, the sandwiching technique taught in McMillan fails to resolve other problems as it only makes the motor's profile wider.

Furthermore, the profile of a motor must not only be narrow enough to fit within the narrow box fan, but once the motor is mounted within the narrow box and equipped with a blade assembly and the protective grills, the product must pass the "Probe Test" to gain UL approval. The "Probe Test" by UL is a test that determines if the fan product possesses the necessary clearance between the front of the bladed propeller and the front grill of the fan housing. If the blade rotates in a position that is too close to the front grill, it is determined to be potentially dangerous for consumers, and will not obtain UL approval. Generally, this test includes operating the fan while pushing a probe against the front grill with a given amount of force (one pound of force). Therefore, the fan motor must be mounted in a position that permits secure attachment of the blade assembly, without the blade assembly advancing too close to the front grill. It would be advantageous, therefore, to devise a structure for such a box fan with a four-pole PSC motor that may be mounted in a relatively narrow space, while keeping the bladed propeller away from the front grill.

Another problem with using a four-pole PSC motor in a narrow space within a fan is the relatively large thickness of such motors. The typical four-pole PSC motor has the bulk of its copper windings positioned on either of the sides of the laminations, thereby requiring additional thickness to them as compared to shaded pole motors. Further, by current UL standards, a clearance space of at least 2.4 millimeters (mm) is required between the copper windings and the cast metal outer casing of the motor. It would be advantageous, therefore, to develop a four-pole PSC motor that has a relatively reduced thickness, without compromising the volume of space required for the copper windings or violating the UL standards of required clearance between the windings and the metal motor casing.

Yet another problem with attempting to make a box fan with a four-pole PSC motor is the fact that most four-pole motors operate at a higher peak torque than what is desirable for such a product. The peak torque of such motors typically resides at about 1200 revolutions per minute (RPM), whereas the peak torque output optimal for a box fan product is approximately 1000 RPM.

Therefore, there is a need for a fan with a four-pole PSC electric motor that has a narrow profile and runs at a lower temperature and peak torque output.

SUMMARY OF THE INVENTION

It is an object of the present invention to provide a narrow box fan with a four-pole PSC electric motor in which the four-pole PSC motor is narrow enough to fit within the narrow box fan.

It is another object of the present invention to provide a narrow box fan having a four-pole PSC motor in which a portion of the casing of the motor is recessed in order to elongate the exposed portion of the output shaft to reduce the width of the motor and blade assembly.

It is a further object of the present invention to provide a narrow box fan in which the motor has legs which extend off the sides of the rear casing for securely mounting to parallel brackets on the rear grill of the fan.

It is still a further object of the present invention to provide a box fan with a four-pole PSC motor in which the laminations are sandwiched by the casings, and the inner dimensions of the casings are wider than the windings so that wiring may pass through the casings through the side of the motor rather than the rear of the motor, thereby reducing the overall width of the motor, and wires may pass along the side of the copper windings.

It is another object of the present invention to provide a narrow box fan having a four-pole PSC motor in which the windings of the motor are spread out in the radial direction and reduced in the axial dimension, thereby reducing the overall width of the profile of the motor.

It is another object of the present invention to provide a narrow box fan having a four-pole PSC motor in which the outer diameter of the windings of the motor extends beyond the outer diameter of the stator slots, whereby efficiency is enhanced and the width of the motor profile is reduced.

It is yet another object of the present invention to provide a narrow box fan in which the vented casings may be placed close to the windings, and in particular, in which the casings are made of plastic, and thus may even be in close proximity or in direct contact with the windings, thereby reducing the width of the motor and improving ventilation for greater efficiency.

It is another object of the present invention to provide a narrow box fan with a four-pole PSC motor in which a portion of the stator slots is flattened, whereby efficiency is improved.

It is a further object of the present invention to provide a narrow box fan with a four-pole PSC motor in which the peak torque of the motor is approximately 1000 rpm.

The present invention is directed to a fan having a four-pole PSC electric motor and a housing for shielding the electric motor. The electric motor comprises a rotor and a stator. The stator includes a core of stacked laminations having a first supporting surface defined by a first outermost lamination and a second supporting surface defined by a second outermost lamination. Copper windings are wound about the stator. The rotor includes an output shaft.

The housing comprises front and rear casings. The casings are generally dome-shaped and centered about a longitudinal axis. The first casing has an interior surface and an exterior surface. The interior surface defines a first chamber. The exterior surface comprises a circumferential side wall connected to a first vented end wall. The first vented end wall has a recessed central area which extends inwardly toward the stacked lamination. The recessed central portion defines a central opening through which the output shaft of the electric motor passes.

The rear casing also has an interior surface and an exterior surface. The interior surface defines a second chamber. The exterior surface comprises a second circumferential side wall connected to a second vented end wall.

The casings are wider in diameter than the stator coils to allow for ventilation, and side entry and passage of lead wires, yet narrow enough in diameter such that aluminum die casting of the casings is feasible.

Other features and advantages of the invention will be apparent from the following specification taken in conjunction with the following drawings.

DETAILED DESCRIPTION

Figure 1:
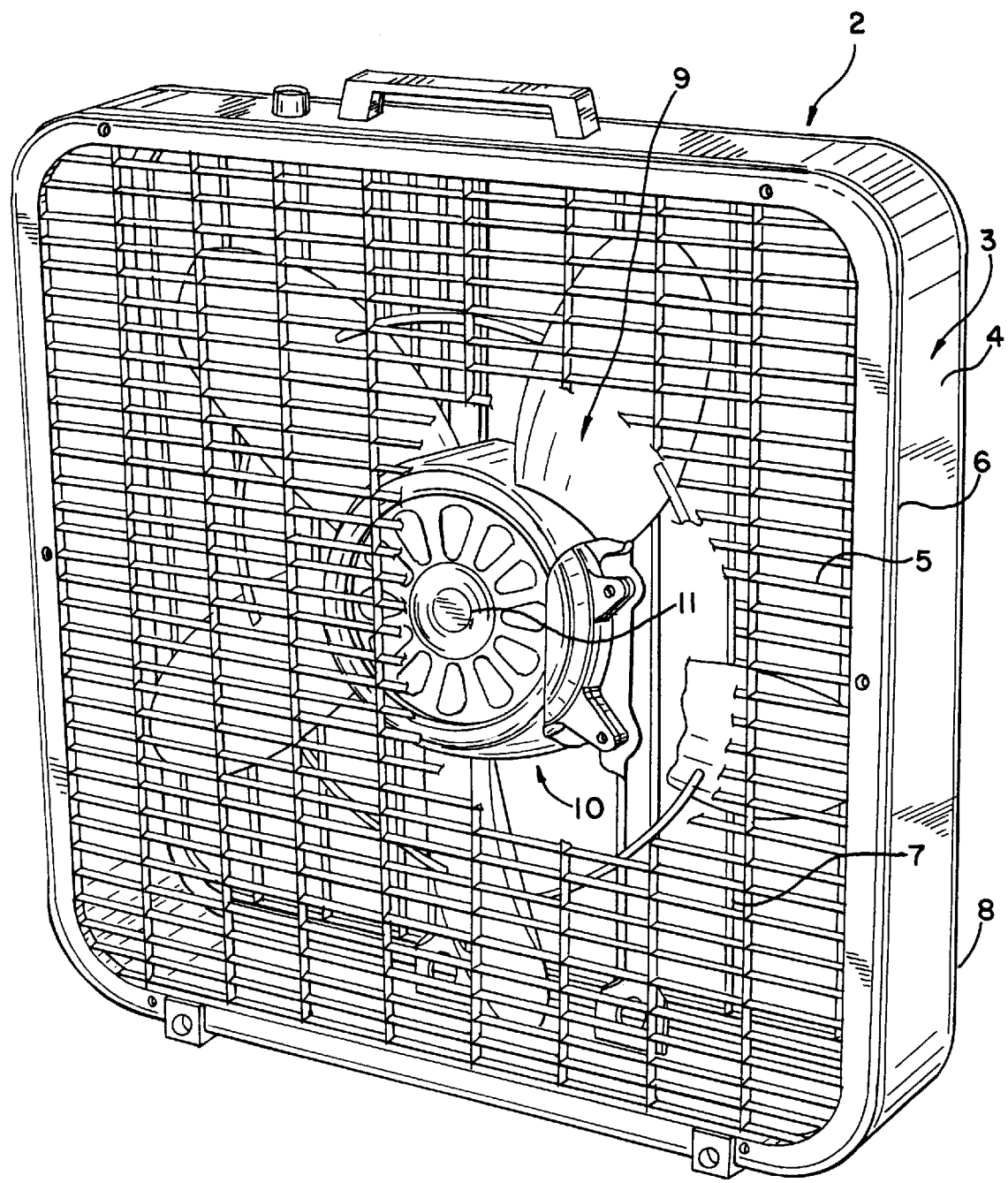
FIG. 1 is a partially cut away front perspective view of the fan assembly of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 is a perspective view of the front of the fan assembly 2. A frame 3 comprises a substantially continuous side wall 4, a front grill 5 attached to the front edge 6 of side wall 4, and a rear grill 7 attached to the rear edge 8 of the side wall 4. A bladed propeller assembly 9 and a motor 10 are housed within the frame 3.

Figure 2:
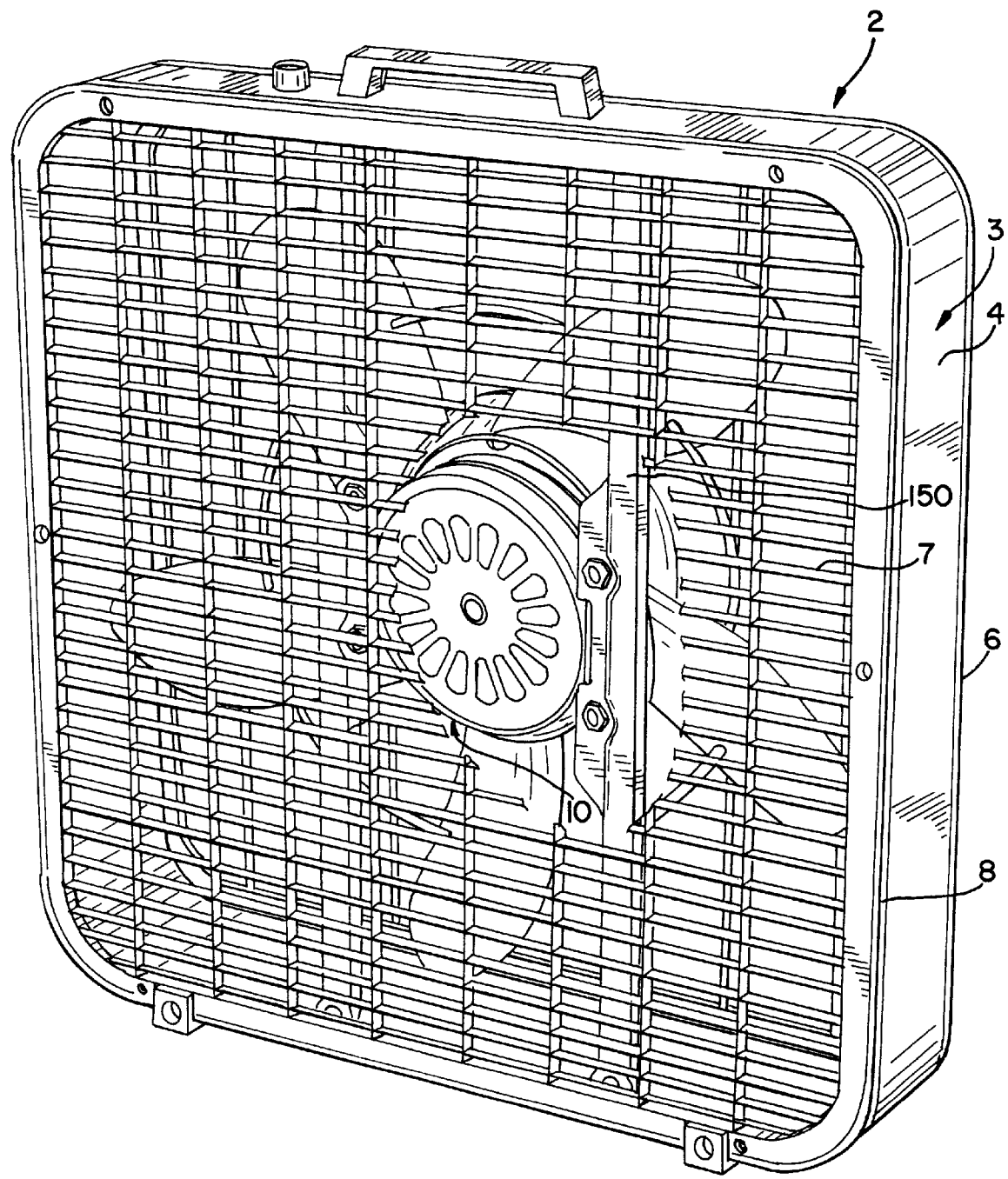
FIG. 2 is a partially cut away rear perspective view of the fan assembly of the present invention.
Figure 3:
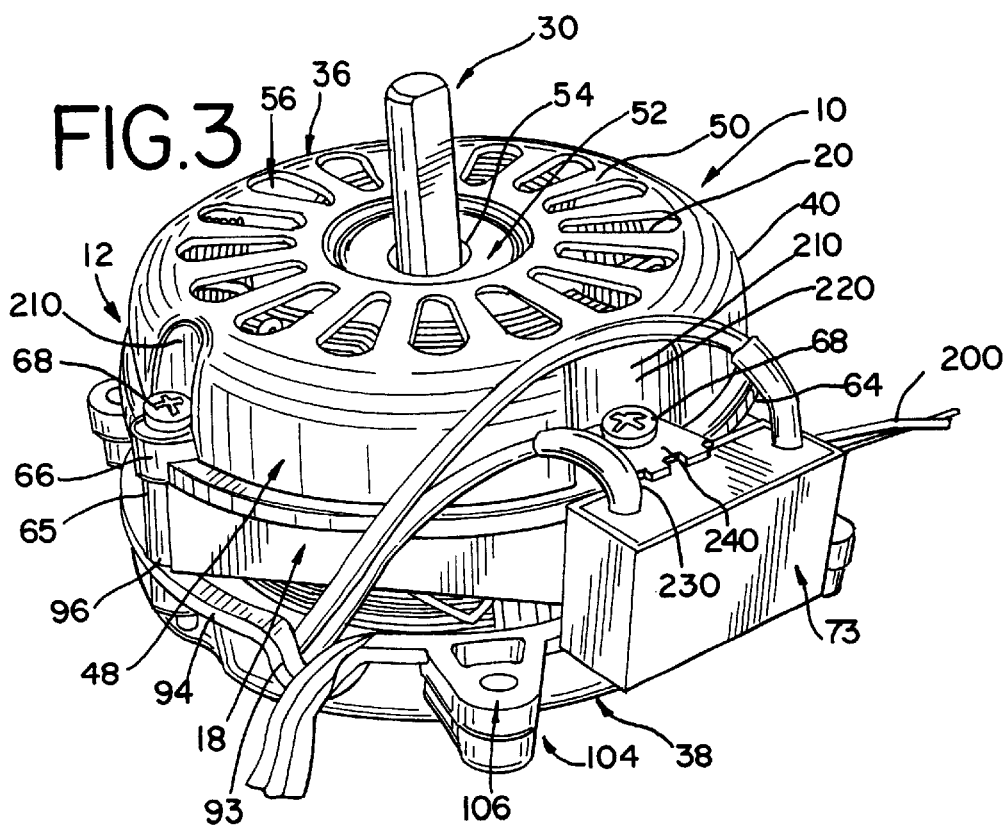
FIG. 3 is a perspective view of the fan motor.

FIG. 3 is a perspective view of a four-pole PSC electric motor 10 of the present invention. The motor 10 includes a motor housing 12 for shielding the electric motor 10. The electric motor 10 includes a stator 14 and a rotor 16. The stator 14 comprises a core of stacked laminations 18 around which copper wires 20 are wound. As shown in FIG. 2, a first outermost lamination 22 in the stack defines a first supporting surface or front surface 24, and a second outermost lamination 26 defines a second supporting surface or rear surface 28. An output shaft 30 is connected to the rotor 16.

The output torque of typical four-pole PSC motors is around 1200 RPM. Since the output torque suitable for a fan is generally 1000 RPM, the torque output of the motor 10 is reduced to approximately 1000 RPM by applying a matrix of material on an outer portion of rotor 16 in order to change its resistance.

The electric motor 10 is generally used to drive a cooling or air circulating household fan assembly 2. In the preferred embodiment, the electric motor 10 is a four-pole PSC motor. The motor 10 and housing 12 combination is particularly useful in the manufacture of a 3¾ inch box fan. Four-pole PSC electric motors have a substantially greater stack height than the shaded-pole motors which are normally used in the manufacture of 3¾ inch box fans. Therefore, conventional four-pole PSC motor/housing combinations are not compatible with 3¾ inch box fans. The present motor/housing combination can be utilized within a 3¾ inch box fan. The following features of the motor 10 and the motor housing 12 allow it to be fit within a 3¾ inch box fan.

Figure 4:
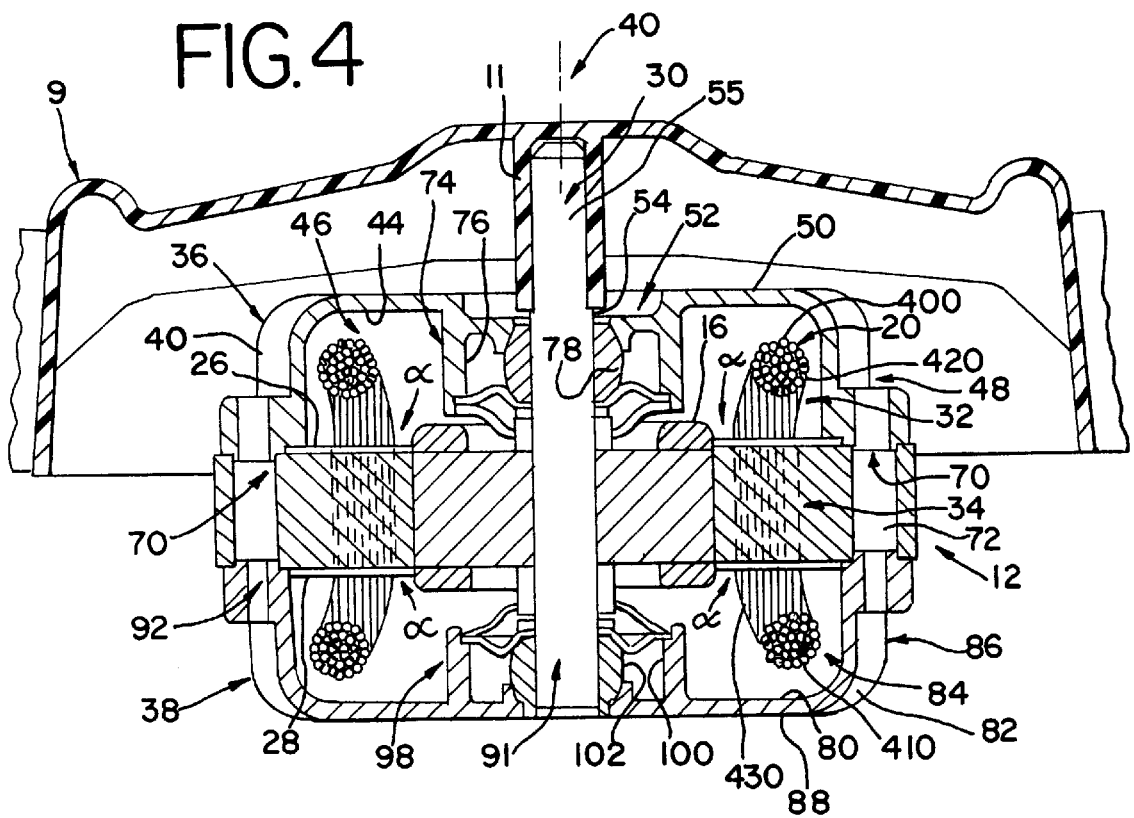
FIG. 4 is a cut away side view of the fan motor of the present invention.
Figure 6:
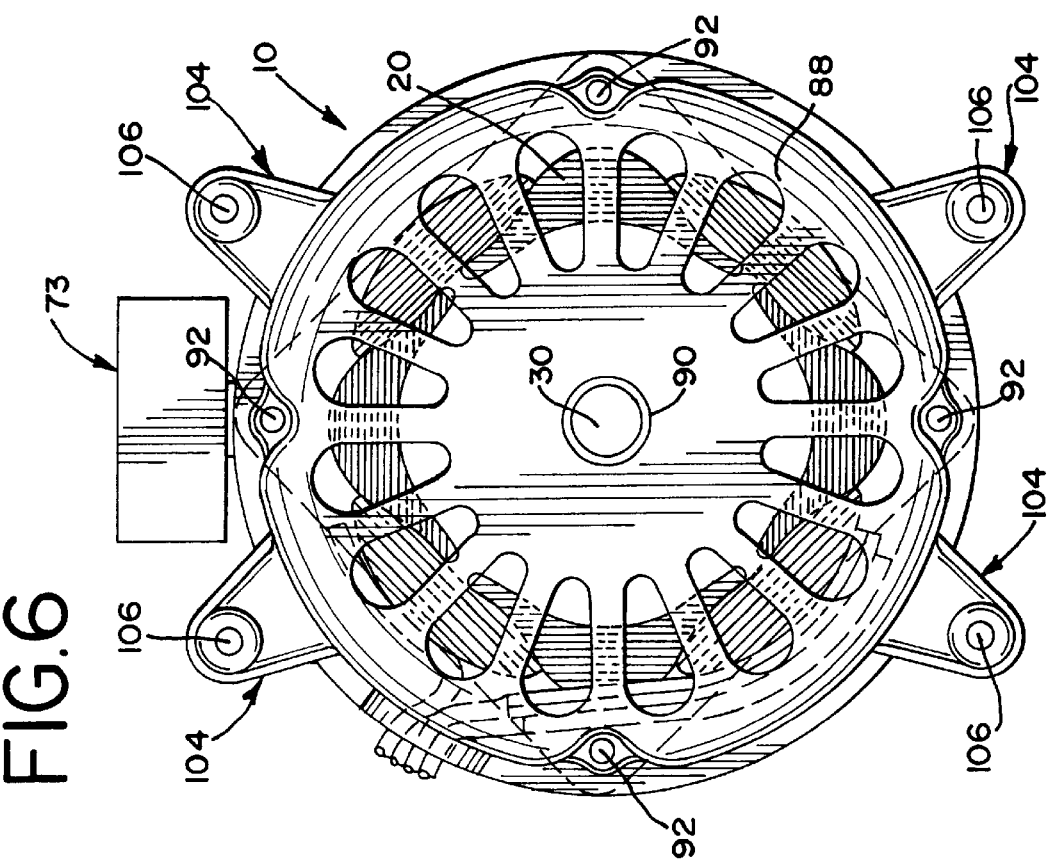
FIG. 6 is a bottom view of the fan motor of the present invention.

Referring to FIG. 4, the motor's windings 20 have first and second parts 32, 34. The first parts 32 extend outwardly from the first and second outermost laminations 22, 26. The second parts 34 pass through the interior of the core 18. The first parts 32 bend as they emerge from the core of stacked laminations 18. The bend of the first and second parts 32, 34 forms a slot exit angle α between the first parts 32 and the first and second supporting surfaces 24 and 28, defined by the angle between the inner (closest to rotor) portion of the respective supporting surfaces 24 and 28, and the inner surface of first parts 32 as it leaves the slots 330. The slot exit angle α is generally greater than 90°. This bending of the first parts 32 allows the windings 20 to be maintained closer to the surface of the core 18, thus the overall thickness of the motor 10 is reduced. The dimensions of the outer circumference 420 and inner diameter 430 of the windings 20 are increased such that the height of the windings 20 between the front surface 24 of the laminations 18 and the front surface 400 of the windings 20, as well as the height of the windings between the rear surface 28 of laminations 18 and the rear surface 410 of the windings is about ⅝ inch or less. Thus, the motor has a narrower profile than typical PSC motors which have winding heights over ¾ inch. The outer circumference 420 of the windings 20 extends at least 2.0 mm, and preferably about 3.0 mm to an area radially beyond the outer edge of the stator slots 330.

In a preferred embodiment, stator slots 330 have a flattened edge portion 340. This flattened edge portion 340 increases the minimum distance 320 between the edge of the slots 330 and the outer edge of laminations 18 to about 0.174 inch (4.41 mm), compared to about 0.141 inch (3.58 mm) for the stator slots with rounded edge portions 350. The distance 300 between stator slots 330 remains around 0.150 (3.81 mm) in both embodiments. The embodiment having flattened edge portions 340 has an increased efficiency over the rounded edge portion embodiment due to a decrease in bottle-necking of magnetic flux between the edge portion 320 and the edge of the laminations 18 for a given lamination thickness.

In a preferred embodiment, the outer circumference 420 of the windings 20 within at least the rear casing 38 extends radially beyond the laminations 18. The rear casing 38 is preferably wider in at least its inner diameter than the front casing 36, thereby accommodating the wider portion of the windings 20, lead wires 200 adjacent the windings 20, and allowing for more efficient cooling of motor 10. The windings 20 may not extend radially in the front portion of the motor as far as in the rear portion of the motor so that the front casing 36 may be dimensioned to allow for indented portions 210 and apertures 106 to properly align with the laminations 18. The smaller diameter front casing 36 allows for a reduction in materials and facilitates molding.

The motor housing 12 comprises generally dome-shaped first (front) and second (rear) casings 36, 38. The first casing 36 is centered about a longitudinal axis 40 and has a first interior surface 42 and a first exterior surface 44. The first interior surface 42 defines a first chamber 46. The first exterior surface 44 includes a circumferential side wall 48 connected to a first (front) vented end wall 50. The first vented end wall 50 has a recessed central area 52 extending inwardly toward the stacked laminations 18.

The recessed central area 52 defines an opening 54 through which a proximal end 55 of the motor's output shaft 30 passes. The recessed central area 52 is adapted to receive a female connector located on an inner surface of a central hub 11 of the fan blade assembly 9. The female connector is press fit around the output shaft 30 and extends into the recessed central area 52. This recessed central area 52 allows the central hub to function closer to the motor housing 12, thus saving space and producing a narrower profile for placement within a narrow box fan.

Casings 36 and 38 can be formed of aluminum and die-cast, due to their narrower diameter than the casings of typical shaded pole motors. The die-casting of casings 36 and 38 enables production with a high degree of accuracy and consistency. Alternatively, the casings 36 and 38 can be formed of plastic, and placed closer or adjacent to the windings of copper wires 20. The motor construction according to the invention is up to 1.75 lbs. or more lighter than a typical shaded pole motor.

Figure 5:
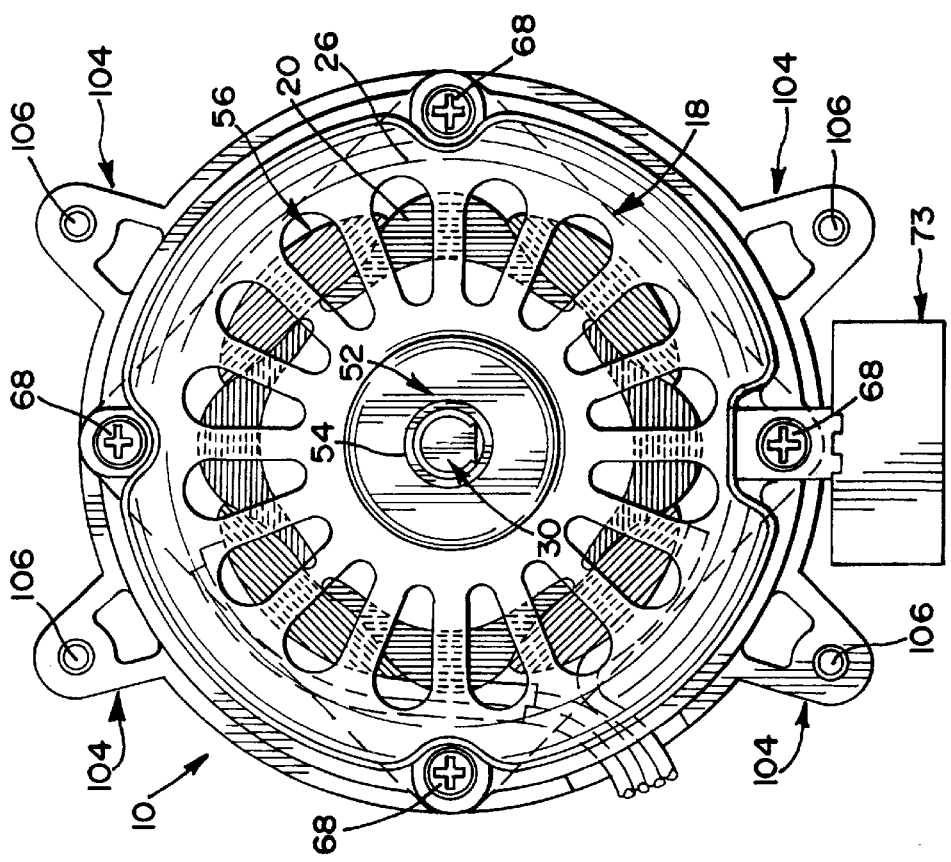
FIG. 5 is top view of the fan motor of the present invention.
Figure 7:
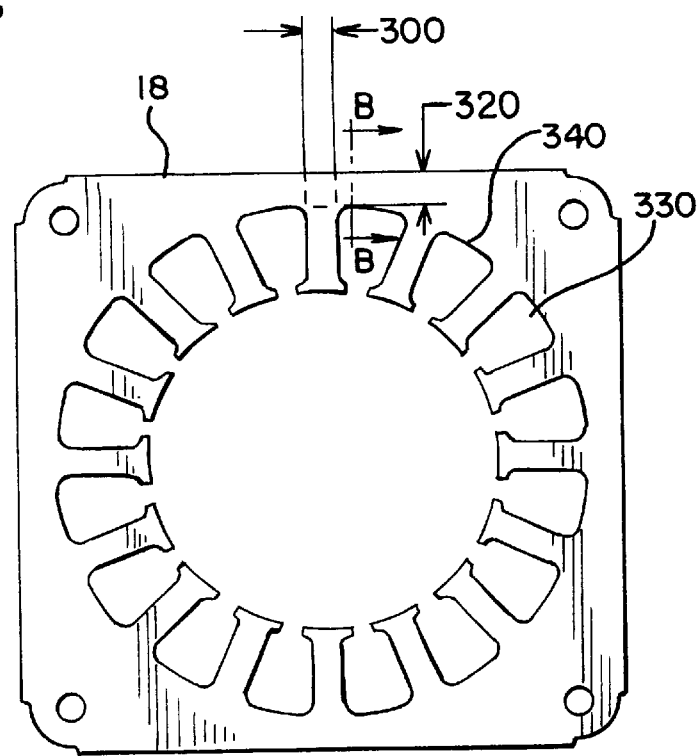
FIG. 7 is a cross-sectional view of one embodiment of the stator having flattened stator slots.
Figure 8:
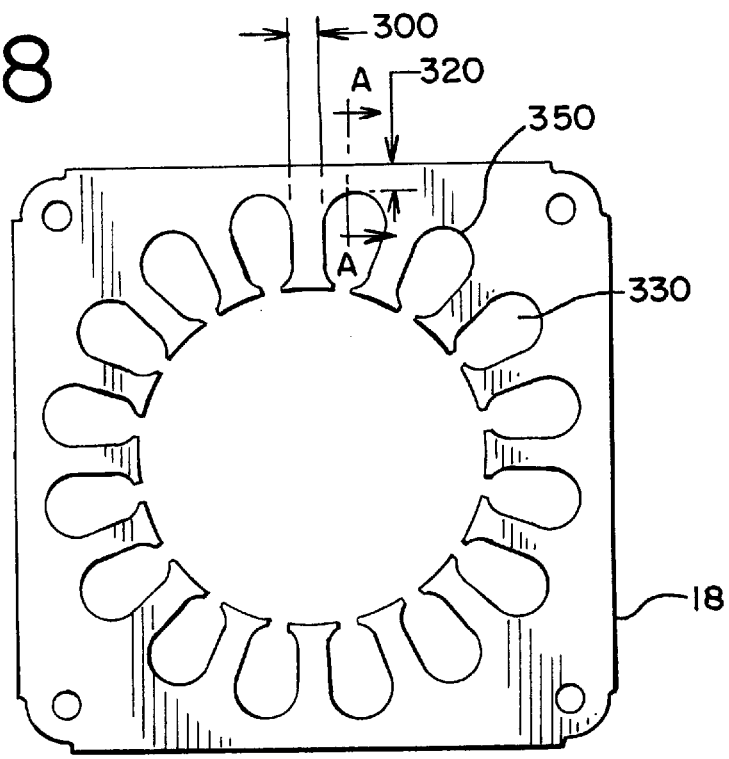
FIG. 8 is a cross-sectional view of another embodiment of the stator having rounded stator slots.

The first vented end wall 50 also includes a plurality of vents 56 (See FIGS. 3 and 5). The vents 56 are tear-shaped and are positioned between the recessed central area 52 and the first circumferential side wall 48. The vents 56 allow air to circulate through the motor housing 12, and the electric motor's 10 operating temperature is lowered by as much as 42° F. (6° C.). The resulting operating temperature of the motor 10 is approximately 65° C. above ambient temperature, thus placing it in the Class A category and allowing for less expensive insulation materials to be used. The motor 10 operates much more efficiently than a typical shaded pole motor, which would require 180–200 Watts of input power to produce the same output power as the motor 10 of the present invention having only about 120 Watts of input power.

At one end, the first circumferential side wall 48 is connected to a first lip portion 64. The first lip portion 64 engages the first supporting portion 22 of the stacked laminations 18. The first lip portion 64 has a plurality of pads or lands 65 which engage the first supporting surface 24. The first lip portion 64 also includes a plurality of bolt holes 66 adapted for receiving bolts or fasteners 68 or other connection means. The bolts 68 are long enough to pass from the first casing 36 through the stacked laminations 18 to the second casing 36. Indented portions 210 protrude into casing 36 and are adapted to make space for bolts 68.

At least one of the indented portions 210 comprises a receiving surface 220 which is geometrically adapted to receive a cooperatively dimensioned edge 230 of a mounting plate 240 attached to capacitor 73. The receiving surface 220 and edge 230 are preferably flat, such that the capacitor 73 can be mounted using a single bolt 68, the cooperating surfaces preventing twisting of the capacitor 73. Other cooperating geometries may optionally be employed. Capacitor 73 is mounted such that it is below the end wall 50 along the side of the motor 10 and clear of any moving parts of the bladed propeller assembly 9.

A boss 70 surrounds each bolt hole 66. The bosses 70 are adapted fit within a portion of lengthwise apertures 72 in the interior of the stacked laminations 18. The bosses 70 act as guides to facilitate assembly of the motors 10.

A first hub 74 is positioned within the first chamber 46 on the first interior surface 42 of the first casing 36. The first hub 74 stabilizes the output shaft 30 within the motor housing 12. The first hub 74 is centered about the longitudinal axis 40. The first hub 74 has a cylindrical side wall 76 that extends from the first interior surface 42 downwardly toward the stacked laminations 18. A sleeve 78 is fitted within the first hub 74 to further stabilize the output shaft 30.

The second (rear) casing 38 also has a second interior surface 80 and a second exterior surface 82. The second interior surface 80 defines a second chamber 84. The second exterior surface 82 comprises a second circumferential side wall 86 connected to a second vented end wall 88. The second (rear) vented end wall 88 is similar to the first vented end wall 50. However, the second vented end wall 88 does not have a central recessed portion 52. The second vented end wall 88 includes an opening 90 through which a distal end 91 of the output shaft 30 passes. (See FIG. 4). The second vented end wall 88 also has a plurality of vents 89. The vents 89 are tear-shaped and surround the opening 90. The vents 89 are positioned between the opening 90 and the second circumferential side wall 86. The vents 89 aid in reducing the operating temperature of the electric motor 10.

The second circumferential side wall 86 has plurality of threaded bolt holes 92 adapted to receive the bolts 68 used to join the first and second casings 36, 38 with the core of stacked laminations 18. The second circumferential side wall 86 also has a U-shaped access 93. Lead wires 200 pass adjacent the windings 20 between the windings 20 and the interior of rear casing 38. A thermal fuse is positioned along the lead wires 200. The lead wires 200 extend from the electric motor 10 through the U-shaped access 93 to a power source.

The second circumferential side wall 86 further includes a second lip portion 94 for engaging the second supporting surface 28. The second lip portion 94 has a plurality of pads or lands 96 which engage the second supporting surface 28. The second lip portion 94 also has a plurality of bosses 70 surrounding each threaded bolt hole 92. The bosses 70 fit within the apertures 72 which pass through the core of stacked laminations 18. The pads or lands 65, 96 of the first and second lip portions 64, 94 cooperate to sandwich the stacked laminations 18 between the first and second casings 36, 38 in such a way that the two outermost laminations 22, 26 are not positioned within the first and second chambers 46, 84.

A second hub 98 is positioned within the second chamber 84 on the second interior surface 80 of the second casing 38. The second hub 98 stabilizes the output shaft 30 within the motor housing 12. The second hub 98 is also centered about the longitudinal axis 40. The second hub 98 has a second cylindrical side wall 100 that extends from the second interior surface 80 upwardly toward the stacked laminations 18. A sleeve 102 is fitted within the second hub 98 to further stabilize the output shaft 30.

The second circumferential side wall 86 further comprises an extended body portion for attachment to mounting surfaces of the fan, the extended body portion extending radially outward of the side wall of the rear casing and preferably comprised of a plurality of mounting brackets or legs 104. The mounting brackets 104 are integral with the second circumferential side wall 86 and spaced a distance from the second vented end wall 88. The spacing or offset helps allow the motor 10 to be used in a narrow box fan. Each mounting bracket or leg 104 has an opening or aperture 106 for receiving a fastening device. In one preferred embodiment, the extending body portion includes a rear surface which surrounds the apertures 106 and is aligned with the end wall of the rear casing 38. The fastening device attaches the motor 10 to a support bracket 150 within the fan frame 3. Normally, the space between the support brackets is lost because the motor housing lies completely in front of the support bracket. However, by offsetting the mounting brackets 104 the motor housing 12 extends between the support brackets and the motor housing 12 can be accommodated within a narrow box fan, such as a 3¾ inch box fan. The mounting brackets or legs 104 are preferably positioned in pairs in such a way that a first line defined by and extending through the centers of the rear sides of the openings 106 of each of two primary legs or brackets 104 is parallel to a second line defined by and extending through the centers of the rear side of the openings 106 of the other two secondary legs or brackets 104, and the lines are adjacent and clear of the casing 38.

A method for producing a narrow household box fan is also disclosed. The method includes the steps of providing a fan housing having a motor support within an interior cabinet. The above-described four-pole PSC electric motor with motor housing is attached to the motor support. A blade assembly is then press fit onto the proximal end of the output shaft.

While specific embodiments have been illustrated and described, numerous modifications are possible without departing from the spirit of the invention, and the scope of protection is only limited by the scope of the accompanying claims.

What is claimed is:

1. A fan assembly comprising:
    a frame having a substantially continuous outer side wall and front grill proximal to a front edge of the side wall and a rear grill proximal to a rear edge of the side wall;
    a motorized blade assembly having a four-pole permanent-split capacitor electric motor and an integrally attached bladed propeller with a central hub, said motor having a rotor with a rotatable output shaft extending from a front side of said motor secured to said bladed propeller, and having a front casing with a front end wall and a side wall and an interior portion, the front end wall having a central opening through which a proximal end portion of the output shaft passes, a rear casing having an end wall and a side wall and an interior portion, the motor further comprising a stator having copper windings and a core of stacked laminations, the front casing being disposed on a front surface of the laminations, and the rear casing being disposed on a rear surface of the laminations, said windings extending through a plurality of slots in said stator and being partially disposed within the interior of the front casing and partially disposed within the interior of the rear casing, said windings passing into said interior portion of at least one of either the front casing or the rear casing with an obtuse inner angle.

2. The fan according to claim 1, wherein the front casing has an outer recessed portion surrounding the central opening around the output shaft of the rotor which extends inward toward the rear casing, whereby said recess exposes a length of the output shaft inward of said front end wall.

3. The fan assembly of claim 2, wherein at least a portion of said bladed propeller hub resides within said recess.

4. The fan according to claim 1, wherein the motor further comprises an extended body portion for attachment to mounting surfaces of the fan, the body portion extending radially outward of said sidewall of the rear casing, a plurality of mounting apertures through said body portion being positioned on opposed sides radially outward of the sidewall of the rear casing.

5. The fan according to claim 4, wherein the extended body portion has a rear surface surrounding said apertures, said rear surface being aligned with said end wall of the rear casing.

6. The fan according to claim 4, wherein the extended body portion comprises a plurality of legs, each said leg having at least one said aperture.

7. The fan according to claim 4, wherein a first plurality of said apertures is positioned along a first axis passing through a portion of a rear side of the first plurality of apertures, and a second plurality of said apertures is positioned along a second axis passing through a portion of a rear side of the second plurality of apertures, each said axis extending adjacent and outward of said sidewall of the rear casing.

8. The fan according to claim 1, wherein the sidewall of said rear casing comprises a widened region, adapted to provide a passageway between the windings and the sidewall for electrical wires to pass between said sidewall and said windings.

9. The fan according to claim 1, wherein the front casing and the rear casing comprise ventilation apertures located proximal to said windings.

10. The fan according to claim 9, wherein the ventilation apertures are evenly spaced and concentrically disposed in the end wall of the front casing and the rear casing.

11. The fan according to claim 10, wherein the ventilation apertures are generally tear-drop shaped.

12. The fan according to claim 1, wherein the rear casing is formed of plastic and said windings are in contact with said rear casing.

13. The fan according to claim 1, wherein the rear casing and the front casing are formed of die-cast aluminum.

14. The fan according to claim 1, wherein the front casing is fastened to the rear casing by fasteners passing through the laminations.

15. The fan according to claim 14, wherein the fasteners pass through the laminations at outer-most regions of said laminations.

16. A fan according to claim 15, wherein the operating temperature of the motor is less than 75° C. over ambient temperature.

17. The fan according to claim 1, wherein said outer peripheral area of the windings extends at least 2 millimeters radially outward of an outer circumference of the stator slots.

18. The fan according to claim 17, wherein the stator slots have a flattened outer edge.

19. The fan assembly according to claim 1, wherein said fan is a narrow box fan having said sidewall formed of sheet metal with four segments forming a generally rectangular arrangement and having a thickness passing between said front and rear grill, said thickness being less than four inches; the motor being mounted within the frame with the rear casing of the motor being in direct contact with said rear grill.

20. The fan assembly according to claim 1, wherein said rear casing includes an opening in said sidewall adapted for electrical wires to pass through said opening.

21. The fan assembly according to claim 1, wherein said outer peripheral area of at least the portion of said copper windings which is disposed within the interior of one of either the rear casing or the front casing extends to an area radially outward of the laminations.

22. The fan assembly according to claim 15, wherein said front casing further comprises indented portions adapted to receive a portion of the fasteners.

23. The fan assembly according to claim 22, wherein at least one of the indented portions comprises a receiving surface having a geometry adapted to receive a cooperatively dimensioned edge of a mounting plate for securing a capacitor to said front casing.

24. The fan assembly according to claim 14, wherein a capacitor is mounted to the side wall of the front casing, the capacitor being mounted by a single one of said fasteners passing through said laminations.

25. The fan assembly according to claim 1 wherein a capacitor is disposed below the front end wall along a side of the motor, the capacitor being positioned clear of moving parts of the bladed propeller.

26. A fan assembly comprising:
 a frame having frame body side wall, a front grill proximal to a front edge of the side wall and a rear grill to a rear edge of the side wall;
 a fan motor assembly having a bladed propeller with a central hub integrally attached to a four-pole permanent-split capacitor electric motor with a stator, said stator having an outer peripheral edge, a core of stacked laminations with a first supporting surface defined by a first exposed lamination and a second supporting surface defined by a second exposed lamination, and copper windings passing through openings in said laminations such that said windings pass through a portion of the stacked laminations;
 said fan motor assembly having a rotor and having an output shaft secured to the hub of said bladed propeller, and
 said fan motor assembly further having a motor housing including a front casing having a first interior surface defining a first chamber and a first exterior surface comprising a first circumferential side wall connected to a front end wall, the front end wall having a central opening through which a proximal end portion of the output shaft passes, the rear casing having a second interior surface defining a second chamber and a second exterior surface comprising a second circumferential side wall connected to a rear end wall, said windings passing from said laminations at an obtuse inner angle.

27. A fan assembly according to claim 26, wherein the copper windings have outer portions extending radially outward from said openings of said laminations.

28. A fan assembly comprising:
 a frame having a substantially continuous outer side wall and front grill and a rear grill;

a motorized blade assembly having a four-pole permanent-split capacitor electric motor and an integrally attached bladed propeller with a central hub, said motor having a rotor with a rotatable output shaft extending from a front side of said motor secured to said bladed propeller, and having a front casing with a front end wall and a side wall and an interior portion, the front end wall having a central opening through which a proximal end portion of the output shaft passes, a rear casing having an end wall and a side wall and an interior portion, the motor further comprising a stator having copper windings and a core of stacked laminations, the front casing being disposed on a front surface of the laminations, and the rear casing being disposed on a rear surface of the laminations, said windings extending through a plurality of slots in said stator and passing beyond said slots at an obtuse inner angle and having a first height between the front surface of the laminations and a front surface of the windings and a second height between the rear surface of the laminations and a rear surface of the windings, at least one of the first and second heights being less than about 0.625 inch.

29. A fan assembly comprising:

a fan housing having a body wall and a front grill attached thereto to cooperatively define an internal space;

a motor being secured to the housing within said internal space, the motor having a front casing with a front end-wall and a sidewall, and the motor having a rear casing with a rear end-wall and sidewall;

said front and rear casings being separated by stacked laminations, the front casing being disposed on a front surface of the laminations, and the rear casing being disposed on a rear surface of the laminations;

said motor having windings passing through a series of transverse apertures in the laminations with a portion of the windings being disposed in the front chamber and a portion of the windings being disposed in the rear chamber;

said front casing having an outer recessed portion of the front end-wall generally disposed in the center of the end-wall and surrounding a central opening of the end-wall with an output shaft of the motor passing through said opening;

the recessed portion having an inwardly directed passageway of the front end-wall toward the rear end-wall, and being adapted to expose an adjacent segment of the output shaft.

30. The fan assembly of claim 29, wherein;

fan blade member is connected to the output shaft, with a portion of the fan blade member being connected to the output shaft at said adjacent segment.

31. A fan assembly comprising:

a fan housing having a body wall and a front grill attached thereto to cooperatively define an internal space;

motor being secured to the housing within said internal space, the motor having a front casing with a front end-wall and a sidewall, and the motor having a rear casing with a rear end-wall and sidewall;

said front and rear casings being separated by stacked laminations, the front casing being disposed on a front surface of the laminations, and the rear casing being disposed on a rear surface of the laminations;

said motor having windings passing through a series of transverse apertures in the laminations with a portion of the windings being disposed in the front chamber and a portion of the windings being disposed in the rear chamber;

the motor further having an extended body portion extending radially outward of the rear sidewall, the extended body portion having a plurality of apertures for mounting said motor within the fan internal space, at least one pair of mounting apertures being aligned along a first axis outward of the rear housing, and a second pair of apertures being aligned along a second axis outward of the rear housing.

32. The fan assembly of claim 31, wherein;

the motor has a plurality of extended body portions extending radially outward of said rear casing sidewall, and having at least two pairs of apertures, a first pair of apertures being aligned along a fist axis outward of the sidewall, and a second pair of apertures being aligned along a second axis outward of the sidewall and being generally opposite said first axis.

33. A motor for a fan assembly, comprising;

a front casing with a front end-wall and a sidewall, and a rear casing with a rear end-wall and sidewall, and a plurality of stacked laminations disposed between said front an rear casings to define a front chamber between the laminations and the front end-wall, and a rear chamber between the laminations and the rear end-wall;

said motor having windings passing through a series of transverse apertures in the laminations with a portion of the windings being disposed in the front chamber and a portion of the windings being disposed in the rear chamber;

said rear casing having a width defined by said rear casing side wall, and being adapted to provide a passageway for at least an extent of electrical wires to pass into said rear chamber radially outward of said windings.

* * * * *

(12) EX PARTE REEXAMINATION CERTIFICATE (5015th)
United States Patent
Chen

(10) Number: US 6,227,822 C1
(45) Certificate Issued: *Nov. 9, 2004

(54) FAN WITH IMPROVED ELECTRIC MOTOR AND MOUNTING

(75) Inventor: Yung Chen, Clarendon Hills, IL (US)

(73) Assignee: Lakewood Engineering and Manufacturing Co., Chicago, IL (US)

Reexamination Request:
No. 90/006,425, Oct. 28, 2002

Reexamination Certificate for:
Patent No.: 6,227,822
Issued: May 8, 2001
Appl. No.: 09/175,635
Filed: Oct. 20, 1998

(*) Notice: This patent is subject to a terminal disclaimer.

(51) Int. Cl.[7] ............... F04B 17/00; F04B 35/04; H02K 9/00
(52) U.S. Cl. ............... 417/423.7; 417/360; 310/63
(58) Field of Search ............... 417/423.1, 423.7, 417/423.15, 423.14; 310/52–63, 71, 89; 416/209 R, 214 R

(56) References Cited

U.S. PATENT DOCUMENTS

| | | |
|---|---|---|
| 748,771 A | 1/1904 | Morris |
| 1,139,158 A | 5/1915 | Boerries |
| 1,212,282 A | 1/1917 | Tiffany |
| 1,751,209 A | 3/1930 | Kucher |
| 1,761,587 A | 6/1930 | Ringland |
| 1,784,624 A | 12/1930 | Ford |
| 1,822,263 A | 9/1931 | Apple |
| 2,157,141 A | 5/1939 | Murray |
| 2,419,156 A * | 4/1947 | Packer ............... 310/62 |
| 2,462,204 A * | 2/1949 | Ludwig ............... 310/258 |
| 2,465,042 A | 3/1949 | Schlenker et al. |
| 2,508,144 A | 5/1950 | Carville |
| 2,592,471 A | 4/1952 | Sawyer |
| 2,610,992 A | 9/1952 | Johns et al. |
| 2,611,797 A | 9/1952 | Beckwith et al. |
| 2,613,240 A | 10/1952 | Robinson |
| 2,650,316 A | 8/1953 | Johns et al. |

(List continued on next page.)

FOREIGN PATENT DOCUMENTS

| | | |
|---|---|---|
| CA | 607613 | 10/1960 |
| FR | 2 661 055 A1 | 10/1991 |
| GB | 197806 | 6/1978 |
| GB | 1 515 197 | 6/1978 |
| GB | 2 126 017 A | 3/1984 |
| JP | 57-3544 | 1/1982 |
| JP | 58-172953 | 10/1983 |
| JP | 62-173946 | 7/1987 |
| JP | 6-38418 | 2/1991 |
| WO | WO 91/01584 A1 | 2/1991 |

OTHER PUBLICATIONS

Photos 1(a)–1(f) of motor; Date: before Oct. 20, 1998.
Photos 2(a)–2(e) of motor; Date: before Oct. 20, 1998.
Photos 3(a)–3(j) of motor; Date: before Oct. 20, 1998.
Photos 4(a)–4(h) of Lasko motor; Date: before Oct. 20, 1998.
Photos 5(a)–5(f) of motor; Date: before Oct. 20, 1998.
Form Time Industries Ltd. Catalog; Date: after Oct. 20, 1998.

*Primary Examiner*—Charles G Freay

(57) ABSTRACT

A household fan with motor and motor housing for shielding the motor. The electric motor is preferably a four-pole permanent-split capacitor motor with a narrow profile enabling it to fit within a narrow box fan, the motor having a stator including a core of stacked laminations. A first outermost lamination defines a first supporting surface, and a second outermost lamination defines a second supporting surface on which the front and rear casings are supported. Copper windings are wound about the core. A rotor has an output shaft which passes through a central region of the core. The front and rear casings are generally dome-shaped. Each casing has a circumferential side wall and a vented end wall. The front casing has a recessed area around the opening for the output shaft such that a portion of the bladed propeller assembly protrudes within the recessed area, allowing for a narrow profile design. Radially extending legs allow for mounting on parallel brackets along a rear grill of the fan.

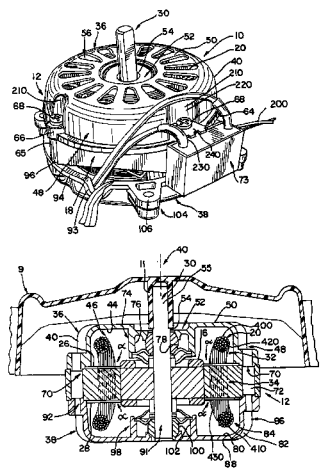

U.S. PATENT DOCUMENTS

| Patent No. | | Date | Inventor |
|---|---|---|---|
| 2,716,195 | A | 8/1955 | Anderson |
| 2,778,958 | A | 1/1957 | Hamm et al. |
| 2,965,289 | A | 12/1960 | Weibel, Jr. |
| 3,038,093 | A | 6/1962 | Needham et al. |
| 3,257,572 | A | 6/1966 | Ludemann et al. |
| 3,371,236 | A | 2/1968 | Swanke |
| 3,422,292 | A | 1/1969 | McCoy et al. |
| 3,548,226 | A | 12/1970 | Sato |
| 3,560,823 | A | 2/1971 | Nystuen |
| 3,638,055 | A | 1/1972 | Zimmermann |
| 3,717,779 | A | 2/1973 | Hallerback |
| 3,740,598 | A | 6/1973 | Hallerback |
| 3,787,014 | A | 1/1974 | Story et al. |
| 3,953,751 | A | 4/1976 | Merkle et al. |
| 3,958,140 | A | 5/1976 | Horgan |
| 3,967,915 | A | 7/1976 | Litzenberg |
| 4,017,964 | A | 4/1977 | Schulte et al. |
| 4,084,491 | A | 4/1978 | Spotts et al. |
| 4,104,551 | A | 8/1978 | Blank et al. |
| 4,118,644 | A | 10/1978 | Schulte et al. |
| 4,120,615 | A | 10/1978 | Keem et al. |
| 4,350,472 | A | 9/1982 | Morimoto |
| 4,451,749 | A | 5/1984 | Kanayama et al. |
| 4,473,764 | A | 9/1984 | White |
| 4,511,310 | A * | 4/1985 | Pearce ............. 416/134 R |
| 4,515,538 | A | 5/1985 | Shih |
| 4,603,273 | A | 7/1986 | McDonald |
| 4,657,483 | A | 4/1987 | Bede |
| 4,670,677 | A | 6/1987 | Snider et al. |
| 4,682,065 | A | 7/1987 | English et al. |
| 4,754,526 | A | 7/1988 | Tremoulet, Jr. et al. |
| 4,757,221 | A | 7/1988 | Kurihashi et al. |
| 4,759,526 | A | 7/1988 | Crawford et al. |
| 4,849,667 | A | 7/1989 | Morrill |
| 4,867,647 | A | 9/1989 | Chow |
| 4,904,891 | A * | 2/1990 | Baker et al. ............. 310/62 |
| 4,968,228 | A | 11/1990 | Da Costa et al. |
| 5,053,666 | A | 10/1991 | Kliman et al. |
| 5,061,157 | A * | 10/1991 | Arakawa ............. 417/423.14 |
| 5,079,464 | A | 1/1992 | King et al. |
| 5,079,467 | A | 1/1992 | Dorman |
| 5,200,658 | A | 4/1993 | Kohno et al. |
| 5,245,237 | A | 9/1993 | Fisher et al. |
| 5,410,201 | A | 4/1995 | Tanaka et al. |
| 5,430,338 | A | 7/1995 | McMillan et al. |
| 5,430,931 | A | 7/1995 | Fisher et al. |
| 5,473,211 | A | 12/1995 | Arkkio |
| 5,487,213 | A | 1/1996 | Hult et al. |
| 5,493,158 | A | 2/1996 | Daniels |
| 5,528,436 | A | 6/1996 | Peter |
| 5,554,902 | A | 9/1996 | Kessens et al. |
| 5,564,914 | A | 10/1996 | Kobayashi et al. |
| 5,567,133 | A | 10/1996 | Kobaybashi et al. |
| 5,627,424 | A | 5/1997 | Steiner |
| 5,648,694 | A | 7/1997 | Kobayashi et al. |
| 5,650,675 | A | 7/1997 | Kanaya et al. |
| 5,689,404 | A | 11/1997 | Katsui |
| 5,696,415 | A | 12/1997 | Fujimoto et al. |
| 5,714,816 | A | 2/1998 | Jensen et al. |
| 5,723,926 | A | 3/1998 | Obara et al. |
| 5,729,071 | A | 3/1998 | Steiner |
| 5,734,214 | A | 3/1998 | Gilliland et al. |
| 5,741,124 | A | 4/1998 | Mazzucato et al. |
| 5,760,519 | A | 6/1998 | Fulton |
| 5,767,596 | A | 6/1998 | Stark et al. |
| 5,783,879 | A | 7/1998 | Furlani et al. |
| 5,797,718 | A | 8/1998 | Gerling et al. |
| 5,880,547 | A | 3/1999 | Shoykhet |
| 5,883,490 | A * | 3/1999 | Moreira ............. 318/807 |
| 5,914,550 | A | 6/1999 | Periyathamby et al. |
| 5,932,942 | A | 8/1999 | Patyk et al. |
| 5,936,322 | A | 8/1999 | Yamaguchi et al. |
| 5,939,807 | A * | 8/1999 | Patyk et al. ............. 310/89 |
| 5,945,761 | A | 8/1999 | Sakuma |
| 5,951,267 | A | 9/1999 | Piercey et al. |
| 5,982,057 | A | 11/1999 | Imada et al. |
| 6,002,185 | A | 12/1999 | Nakao et al. |
| RE36,545 | E | 2/2000 | Steiner |
| 6,020,668 | A | 2/2000 | Rubinchik |
| 6,037,688 | A | 3/2000 | Gilliland et al. |
| 6,050,786 | A | 4/2000 | Lin |
| 6,104,114 | A | 8/2000 | Takeda et al. |
| 6,109,887 | A | 8/2000 | Takura et al. |
| 6,126,415 | A | 10/2000 | Lasko |
| 6,144,137 | A | 11/2000 | Engelbert |
| 6,150,743 | A | 11/2000 | Van Dine et al. |
| 6,203,293 | B1 | 3/2001 | Yamamoto et al. |

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–30 is confirmed.

Claims 31–33 are cancelled.

\* \* \* \* \*